United States Patent [19]
Fernandez et al.

[11] Patent Number: 5,986,430
[45] Date of Patent: Nov. 16, 1999

[54] METHOD FOR ULTRA-RAPIDLY CHARGING A RECHARGEABLE BATTERY USING MULTI-MODE REGULATION IN A VEHICULAR RECHARGING SYSTEM

[75] Inventors: Jose Maria Fernandez, Sunrise; Ronald Scot Coapstick, Plantation, both of Fla.

[73] Assignee: Motorola, Inc., Schamburg, Ill.

[21] Appl. No.: 09/110,339

[22] Filed: Jul. 6, 1998

[51] Int. Cl.⁶ .................................. H02J 7/00; H02J 7/14
[52] U.S. Cl. ........................ 320/106; 320/152; 320/162; 320/DIG. 21
[58] Field of Search .................................. 320/137, 156, 320/152, 162, DIG. 12, 106

[56] References Cited

U.S. PATENT DOCUMENTS

| | | | |
|---|---|---|---|
| 5,111,128 | 5/1992 | Branan, Jr. et al. | 320/106 |
| 5,237,257 | 8/1993 | Johnson et al. | 320/106 |
| 5,572,110 | 11/1996 | Dunstan | 320/106 |
| 5,602,455 | 2/1997 | Stephens et al. | 320/106 |
| 5,773,956 | 6/1998 | Wieczorek | 320/152 |
| 5,905,358 | 5/1999 | Fernandez et al. | 320/106 |

*Primary Examiner*—Peter S. Wong
*Assistant Examiner*—Gregory J. Toatley, Jr.
*Attorney, Agent, or Firm*—Frank M. Scutch, III

[57] ABSTRACT

A method (200) for charging a nickel cadmium, nickel-metal hydride or lithium-ion battery cell using an ultra-fast vehicular charging system includes determining (201, 203, 205) manufacturer identity, ultra-fast battery charging capability and battery capacity from the battery system to provide (207) battery type information. A direct current (DC) input voltage in a predetermined input supply voltage range is converted (211) to a an output supply current in a predetermined output voltage range. The predetermined output supply voltage is supplied (217) to the battery cell for recharging while a number of battery parameters are monitored (219) such as the battery cell voltage, charging current and temperature of the battery cell to generate monitoring information. Finally the output supply voltage and the charge current supplied to the battery cell are precisely controlled (223) based upon the battery type information and battery monitoring information in order to safely charge the battery within one-half hours time.

15 Claims, 2 Drawing Sheets

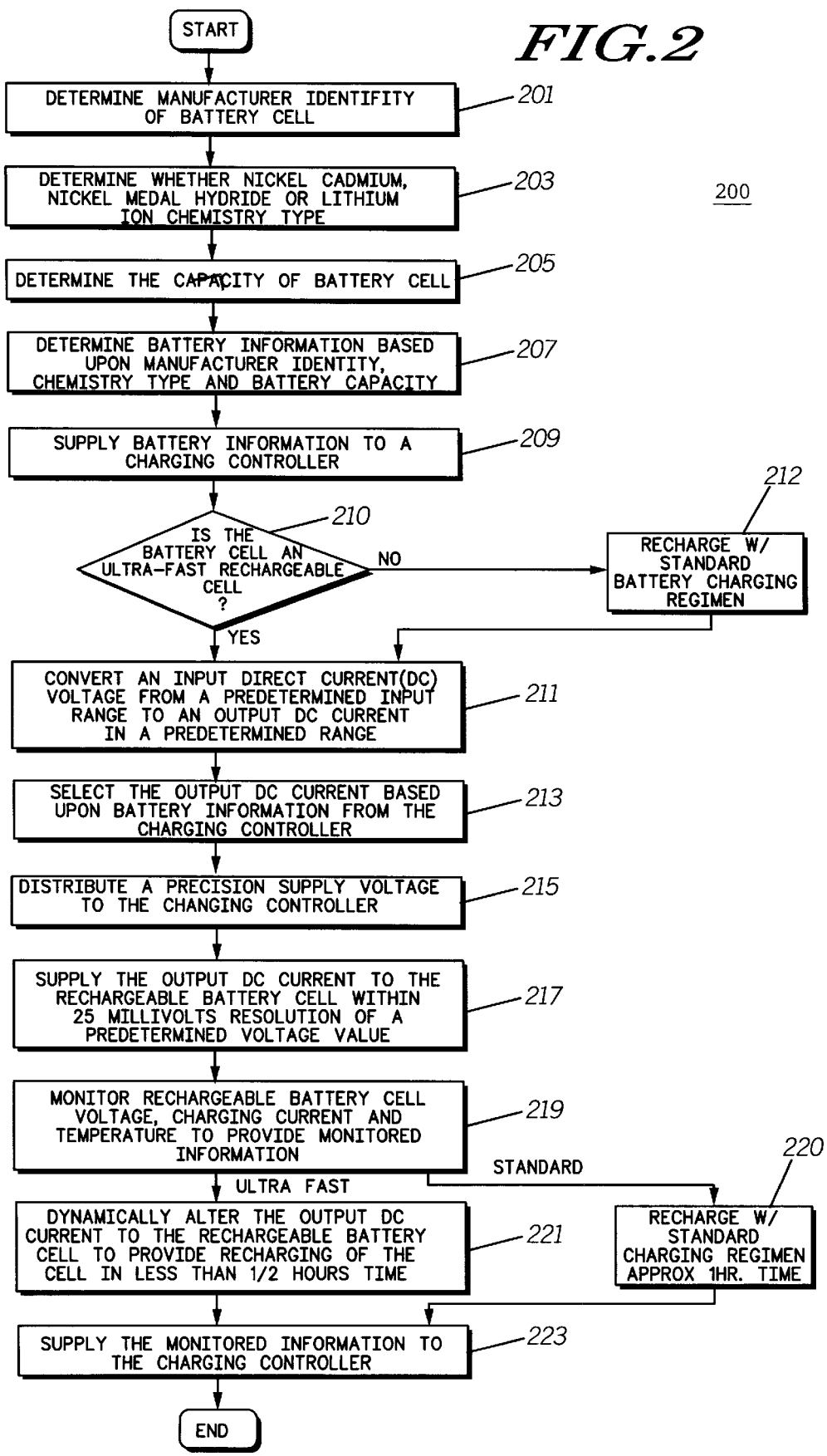

METHOD FOR ULTRA-RAPIDLY CHARGING A RECHARGEABLE BATTERY USING MULTI-MODE REGULATION IN A VEHICULAR RECHARGING SYSTEM

TECHNICAL FIELD

This invention relates in general to battery charging and more particularly to charging regulation during ultra-fast recharging rates.

BACKGROUND

In many portable electronic devices using a rechargeable battery cell, the device specification often requires that the battery be capable of being rapidly recharged in one hour. Often the user considers one hour to be too lengthy a delay and does require the battery in the device to be charged at even a faster rate. Thus, what has been deemed an "ultra-fast" charge of 15 minutes is often required to prevent both the inoperability of the device and any inconvenience to the user.

In order to use ultra charging with either nickel cadmium (nicad), nickel-metal hydride or lithium chemistry batteries, it is necessary that the battery charger have a wide dynamic range. This means that voltage and current regulation is capable of being controlled to a very high degree of resolution such as 25 millivolts or greater. Additionally, this package should be small having a high output power as well as the capability of being housed in an cigarette plug adapter using a direct current (DC) attachment for use with an automobile or the like.

Thus, the need exists for a recharging apparatus and method capable of regulation resolution for use with any one of the standard chemistry types of rechargeable battery cells. Moreover the device should be efficient and housed in a small transformerless package for ultra-charging in a DC to DC environment.

BRIEF DESCRIPTION OF THE DRAWINGS

FIG. 2 is a flow chart showing the method according to the preferred embodiment of the invention.

DETAILED DESCRIPTION OF THE PREFERRED EMBODIMENT

Figure 1:
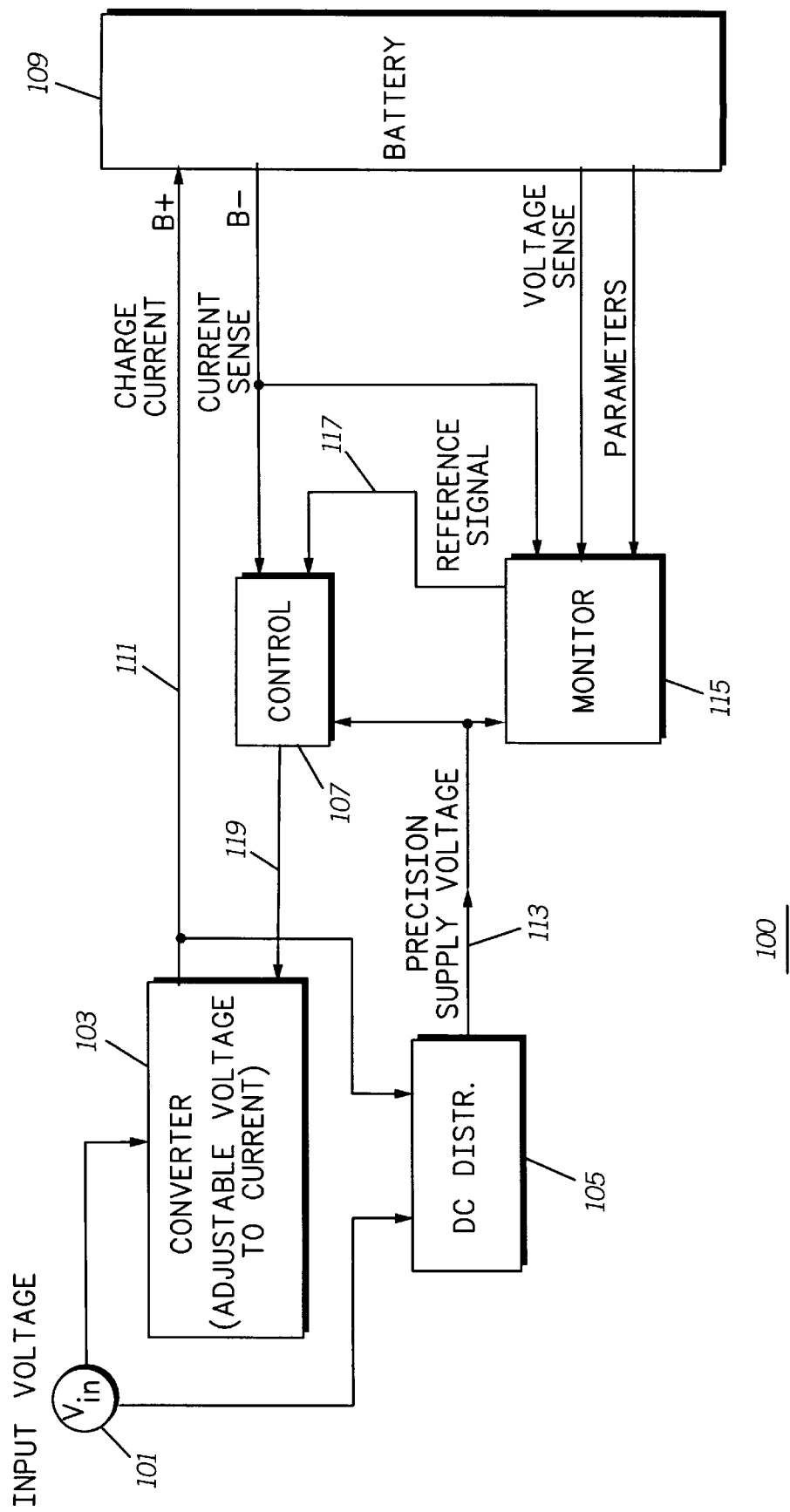
FIG. 1 is a block diagram showing the charging circuit according to the preferred embodiment of the invention.

Referring now to FIG. 1, a ultra-fast vehicular charging system 100 includes a direct current (DC) input voltage 101 supplied to the charging system 100. The DC input voltage 101 is very broad and in a range from approximately 11 volts to 35 volts. The DC input voltage 101 is applied to both a DC converter circuit 103 and a DC distribution circuit 105.

The DC converter circuit 103 is controlled by a controller 107 and acts to convert the DC input voltage to a DC output current supplied to one or more rechargeable battery cells 109 through a charging line 111. It will be evident to those skilled in the art that alternatively the high side or B+ portion of the charging line may also be used. The DC output is supplied at a constant current and is in a range from approximately 4 volts to 10 volts DC as will be discussed herein, the selected voltage has a wide dynamic range precise to within 25 millivolts resolution.

The DC distribution circuit 105 receives an input voltage from either the DC input voltage 101 or from the DC output voltage supplied from the DC converter circuit 103. The DC distribution circuit 105 operates to supply a precision regulated supply voltage, that is typically in a range from 3 to 5 volts DC, using a supply line 113 to both the controller 107 and a monitor circuit 115 discussed herein. Typically the DC distribution circuit 105 operates using the DC output supply voltage from the DC converter circuit 103, if the amplitude of the DC voltage is sufficient enough to power the DC distribution circuit 105.

The controller 107 operates to receive monitoring information from the monitoring circuit 115 through a reference signal line 117 while also sensing the current drawn from the rechargeable battery cell 109. This occurs since the position of controller 107 places it within a current loop with the DC converter circuit 103 and rechargeable battery 109. Thus, the controller 107 detects the charge current from the rechargeable battery 109 and provides signaling information on signaling line 119 to the DC converter circuit 103. This ultimately controls the duty cycle of the converter circuit 103 enabling a wide dynamic range of voltages and currents to be applied to the rechargeable battery 109 from the DC converter circuit 103.

The monitor circuit 115 works by receiving a number of parameters from the rechargeable battery 109 including battery manufacturer identity, battery chemistry such as nickel cadmium, nickel-metal hydride and lithium-ion. Monitoring information further includes battery charging type such as standard, rapid or ultra-fast in addition to battery capacity. As is known in the art, battery manufacture identify can be supplied using various values of a coding resistor, memory devices or the like (not shown). Moreover additional specific battery operational parameters are measured during a recharge cycle such as voltage amplitude, recharging current and temperature of the rechargeable cell to provide monitoring information on the reference signal line 117 to the controller 107. The monitoring information is used by the controller 107 to dynamically adjust the DC converter circuit 103 and to supply a precise voltage and current to the rechargeable cell 109 depending on this parameters.

The preferred method 200 of the invention includes supplying a predetermined charging voltage and charging current having a wide dynamic range to one or more rechargeable battery cell(s) using a ultra-fast vehicular battery charging system. The method includes the steps of: determining manufacturer identity 201 of the battery cell through the use of a coding resistor or the like provided by the manufacturer. A determination is then made of battery type 203 whether the rechargeable battery cell is either nickel cadmium, nickel medal hydride or lithium-ion chemistry. The capacity of the battery cell is also determined 205 and these parameters are supplied 207 to a charging controller. The charging controller then generates 209 battery information based on these parameters. Should it be determined 210 by the vehicular battery charging system that the battery cell is not an ultra-fast type, a standard charging regimen is then selected 212 and the process continues. If however, the cell is an ultra-fast type, the method continues and the battery is safely charged at an ultra-fast rate Based upon this information an input DC voltage from an input range of 11 volts to 35 volts is converted 211 to an output DC voltage in a range from 4 volts to 10 volts. Generally this is accomplished through an automotive or marine vehicle DC supply. A DC output voltage is selected 213 based upon battery information from the charging controller. A precision supply voltage is then distributed 215 to the charging controller for providing a substantially wide dynamic voltage range to the rechargeable battery cell. The output DC voltage is then supplied 217 to the rechargeable battery cell within a 25 millivolts resolution of a predetermined voltage value. The rechargeable battery cell voltage is monitored 219 as well as the charging current and battery temperature to provide monitored information. This monitored information is supplied 221 to the charging controller where in-turn the output DC voltage or current is dynamically altered 223 to the rechargeable battery cell to provide recharging of the cell at an ultra-fast rate i.e. a charge in less than ½ hours time. If however the battery is not an ultra-fast charging type, the cell is recharged using a standard regimen lasting approximately one hours time. As seen in FIG. 2, steps 211 to 219 are common to both the standard and ultra-fast recharging regimens.

Hence those skilled in the art will recognize that the present invention provides a vehicular recharging system and method capable of regulation resolution of approximately 25 millivolts for use with any one of the standard chemistry types of rechargeable battery cells. Moreover the device is highly efficient and housed in a small transformerless package for ultra-charging in a DC to DC environment.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claim is:

1. A method for charging a nickel cadmium, nickel-metal hydride or lithium-ion battery cell using an ultra-fast vehicular charging system comprising the steps of:
   determining manufacturer identity, ultra-fast battery charging capability and battery capacity from the battery system to provide battery type information;
   converting a direct current (DC) input voltage in a predetermined input supply voltage range to a an output supply current in a predetermined output voltage range;
   supplying the predetermined output supply voltage to the battery cell for recharging;
   monitoring the battery cell voltage, charging current and temperature of the battery cell and proving monitoring information therefrom;
   controlling the output supply voltage and the charge current supplied to the battery cell based upon the battery type information and battery monitoring information.

2. A method as in claim 1, wherein the battery cell is recharged using a standard recharging protocol if the battery cell is not recognized as an ultra-fast charge battery.

3. A method as in claim 1, further including the step of:
   distributing a precision supply voltage to the ultra-fast vehicular charging system for providing the output voltage to the battery cell within approximately 25 millivolts DC.

4. A method as in claim 1, wherein the step of disturbing a precision supply voltage derives a distribution input voltage from either the input supply voltage or the output supply voltage for improving charger efficiency.

5. A method as in claim 1, wherein the DC input voltage is in a range substantially between 11 volts and 35 volts.

6. A method as in claim 1, wherein the DC output voltage range is substantially between 4 volts and 10 volts.

7. A method as in claim 1, wherein the battery cell is recharged in less than ½ hours time.

8. A method of charging either a nickel cadmium, nickel-metal hydride or a lithium-ion rechargeable battery cell using an ultra-fast vehicular battery charger comprising the steps of:
   determining a battery type information of the rechargeable battery cell based upon battery chemistry and battery capacity;
   converting an input direct current (DC) voltage in a range between 11 volts and 35 volts to an output DC voltage in a range from 4 volts to 10 volts;
   supplying a predetermined output voltage within 25 millivolts resolution of the predetermined value to the rechargeable battery cell based upon battery type information;
   monitoring the voltage, charging current and temperature of the rechargeable battery cell to provide monitoring information;
   dynamically controlling the predetermined output voltage based upon the monitoring information.

9. A method of charging as in claim 8, wherein the battery type information includes manufacturer identity, ultra-fast battery charging capability and battery capacity.

10. A method of charging as in claim 8, wherein the rechargeable battery cell is recharged in less than ½ hours time.

11. A method of charging as in claim 8, further comprising the step of;
   distributing a precision DC voltage based upon a distribution voltage supplied from either the input DC voltage or the output DC voltage to a controller circuit for supping a predetermine output voltage and current having a wide dynamic range to the rechargeable battery cell.

12. A method of charging as in claim 11, wherein the input DC voltage range is 11 voltages DC to 35 volts DC.

13. A method of charging as in claim 11, wherein the output DC voltage range is 4 volts DC to 10 volts DC in a range from 20 milliamps to 1.8 amps output current.

14. A method of supplying a predetermined charging voltage and charging current having a wide dynamic range to at least one rechargeable battery cell using a ultra-fast vehicular battery charging system comprising the steps of:
   determining manufacturer identity of the battery cell;
   determining whether the rechargeable battery cell is either nickel cadmium, nickel medal hydride or lithium-ion chemistry type;
   determining the capacity of the battery cell:
      determining battery information based upon the manufacturer identity, chemistry type and battery capacity;
      supplying the battery information to a charging controller;
      converting an input direct current (DC) voltage from an input range of 11 volts to 35 volts to an output DC voltage in a range from 4 volts to 10 volts;
      selecting the output DC voltage based upon battery information from the charging controller;
      distributing a precision supply voltage to the charging controller for providing a substantially wide dynamic voltage range to the rechargeable battery cell;
      supplying the output DC voltage to the rechargeable battery cell within 25 millivolts resolution of a predetermined voltage value;

monitoring the rechargeable battery cell voltage, charging current and temperature to provide monitored information;

supplying the monitored information to the charging controller;

dynamically altering the output DC voltage to the rechargeable battery cell to provide recharging of the cell in less than ½ hours time.

15. A method of supplying a predetermined charging voltage as in claim 14, further including the step of:

charging the battery cell at a standard rate when the manufacturer identity indicates that the battery cell is not an ultra-fast charge battery.

\* \* \* \* \*